United States Patent
Furumoto et al.

(10) Patent No.: US 8,140,255 B2
(45) Date of Patent: Mar. 20, 2012

(54) ON-VEHICLE GUIDANCE APPARATUS

(75) Inventors: Yuki Furumoto, Tokyo (JP); Tadashi Suzuki, Tokyo (JP); Fumitaka Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/740,961

(22) PCT Filed: Nov. 19, 2008

(86) PCT No.: PCT/JP2008/003389
§ 371 (c)(1),
(2), (4) Date: Jul. 23, 2010

(87) PCT Pub. No.: WO2009/090702
PCT Pub. Date: Jul. 23, 2009

(65) Prior Publication Data
US 2010/0280749 A1 Nov. 4, 2010

(30) Foreign Application Priority Data
Jan. 17, 2008 (JP) .................................. 2008-008199

(51) Int. Cl.
G01C 21/00 (2006.01)

(52) U.S. Cl. ......................................... 701/201; 381/57

(58) Field of Classification Search .................. 701/201, 701/211, 200; 455/404.2; 381/57, 71.4, 381/86, 92; 704/226, 233; 181/175, 176; 340/425.5
See application file for complete search history.

(56) References Cited

U.S. PATENT DOCUMENTS

| | | | | |
|---|---|---|---|---|
| 7,366,607 B2 * | 4/2008 | Nakaishi et al. | ............... | 701/211 |
| 7,406,380 B2 * | 7/2008 | Sakamoto et al. | ............ | 701/211 |
| 2003/0191585 A1 * | 10/2003 | Sakamoto et al. | ............ | 701/211 |
| 2004/0076302 A1 * | 4/2004 | Christoph | ........................ | 381/57 |
| 2005/0288857 A1 * | 12/2005 | Chen | ................................ | 701/211 |
| 2006/0095204 A1 * | 5/2006 | Kim | ................................ | 701/211 |
| 2006/0147055 A1 * | 7/2006 | Ise | ..................................... | 381/95 |
| 2007/0118380 A1 * | 5/2007 | Konig | ............................. | 704/270 |
| 2008/0143497 A1 * | 6/2008 | Wasson et al. | ............... | 340/425.5 |
| 2009/0290726 A1 * | 11/2009 | Jayachandran | ................ | 381/107 |

FOREIGN PATENT DOCUMENTS

| | | |
|---|---|---|
| DE | 10046238 A1 | 4/2002 |
| JP | 11-55055 A | 2/1999 |
| JP | 2001-116581 A | 4/2001 |
| JP | 2002-156241 A | 5/2002 |
| JP | 2002-188933 A | 7/2002 |
| JP | 2004-108908 A | 4/2004 |
| JP | 2004-354722 A | 12/2004 |
| JP | 2007-263751 A | 10/2007 |
| JP | 2008-170980 A | 7/2008 |

* cited by examiner

Primary Examiner — Thomas Black
Assistant Examiner — Marthe Marc-Coleman
(74) Attorney, Agent, or Firm — Birch, Stewart, Kolasch & Birch, LLP

(57) ABSTRACT

An on-vehicle guidance apparatus is characterized in including an output sound control means for acquiring a sound volume setting of onboard equipment, a sound volume determining means for determining whether or not the sound volume setting is smaller than a predetermined threshold, and a guidance output control means for issuing a command for carrying out voice guidance in response to a determination signal from the sound volume determining means at a time when the sound volume setting becomes smaller than the above-mentioned threshold.

4 Claims, 1 Drawing Sheet

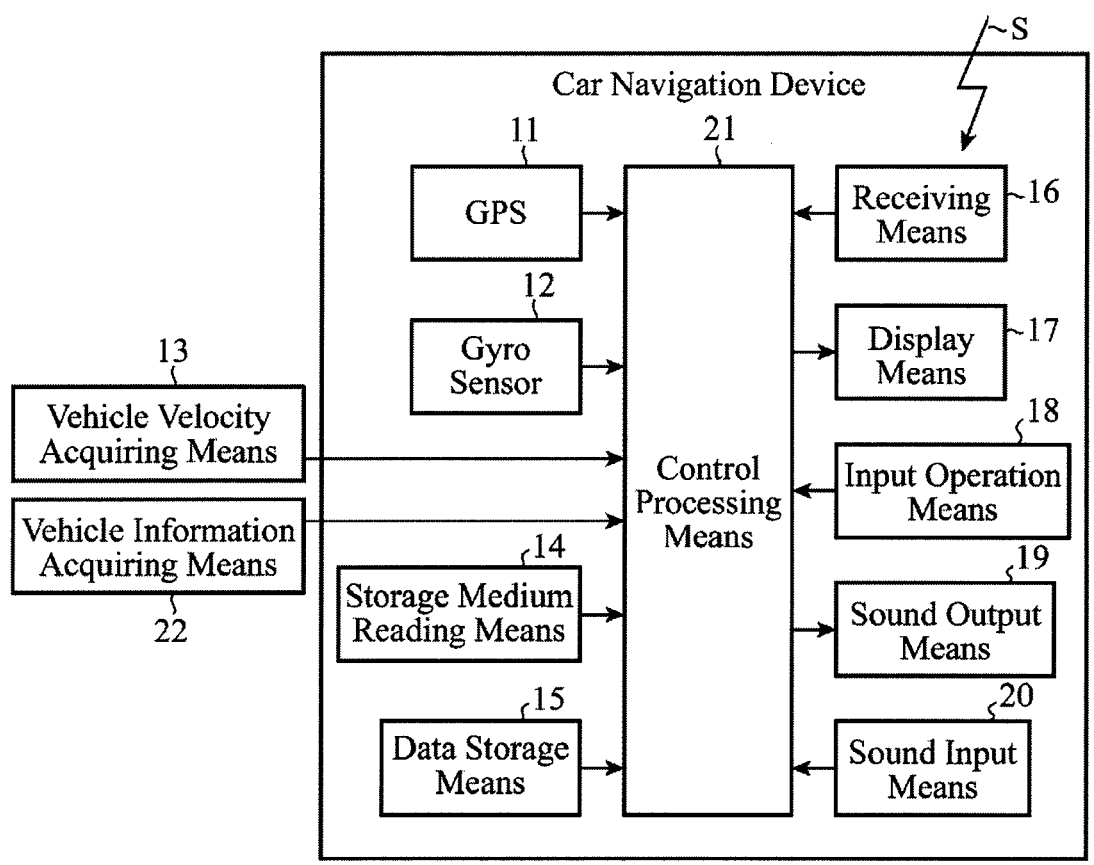

ON-VEHICLE GUIDANCE APPARATUS

FIELD OF THE INVENTION

The present invention relates to an on-vehicle guidance apparatus that determines a time suitable for output of guidance.

BACKGROUND OF THE INVENTION

A problem with a conventional on-vehicle guidance apparatus is that because it always keeps the output sound volume of guidance outputted from a speaker constant even though conditions in a cabin are varying variously, when the user is watching a sport or listening rock music with onboard equipment, such as a TV (Television), a radio, or audio equipment, he or she fails to listen important guidance. To solve this problem, there has been provided a conventional on-vehicle guidance having a microphone for acquiring an output sound of onboard equipment at a location where the sound of the onboard equipment is outputted, for automatically changing the output sound volume of guidance according to the sound volume of the output sound acquired by the above-mentioned microphone (e.g., refer to patent reference 1).
[Patent reference 1] JP, 11-55055,A A problem with the conventional on-vehicle guidance apparatus is that because it only changes the sound volume of guidance, and outputs guidance with an always-fixed description and an always-fixed voice impersonation, when the atmosphere in the cabin is coming alive, such as when the user is watching a sport or listening rock music with onboard equipment, such as a TV (Television), a radio, or audio equipment, the conventional on-vehicle guidance apparatus suddenly outputs guidance with a quiet and calm voice impersonation, and therefore puts a damper on the good atmosphere. A further problem is that because the conventional on-vehicle guidance apparatus changes the output sound volume of guidance according to the sound volume of an output sound from onboard equipment, and does not take into consideration another environmental sound in the cabin, passengers fail to catch important guidance when the atmosphere in the cabin is coming alive.

The present invention is made in order to solve the above-mentioned problems, and it is therefore an object of the present invention to provide an on-vehicle guidance apparatus that can prevent passengers from failing to catch important guidance by determining the time of outputting guidance in such a way that the time is suitable for the situation.

DISCLOSURE OF THE INVENTION

An on-vehicle guidance apparatus in accordance with the present invention is characterized in changing a time of outputting voice guidance according to conditions.

Because the on-vehicle guidance apparatus changes the time of outputting voice guidance according to conditions, the present invention offers an advantage of preventing passengers from failing to catch important guidance, and being able to efficiently provide passengers with guidance.

BRIEF DESCRIPTION OF THE FIGURES

FIG. 1 is a block diagram showing the configuration of a car navigation device in accordance with Embodiment 1;

FIG. 2 is a block diagram showing main components of the car navigation device in accordance with Embodiment 1;

FIG. 3 is a flow chart showing the operation of the car navigation device in accordance with Embodiment 1;

FIG. 4 is a block diagram showing main components of a car navigation device in accordance with Embodiment 2;

FIG. 5 is a flow chart showing the operation of the car navigation device in accordance with Embodiment 2;

FIG. 6 is a flow chart showing the operation of a car navigation device in accordance with Embodiment 3;

FIG. 7 is a block diagram showing main components of a car navigation device in accordance with Embodiment 4;

FIG. 8 is a flow chart showing the operation of the car navigation device in accordance with Embodiment 4;

FIG. 9 is a block diagram showing main components of a car navigation device in accordance with Embodiment 5;

FIG. 10 is a flow chart showing the operation of the car navigation device in accordance with Embodiment 5;

FIG. 11 is a block diagram showing main components of a car navigation device in accordance with Embodiment 6; and FIG. 12 is a flow chart showing the operation of the car navigation device in accordance with Embodiment 6.

PREFERRED EMBODIMENTS OF THE INVENTION

Hereafter, in order to explain this invention in greater detail, the preferred embodiments of the present invention will be described with reference to the accompanying drawings.
Embodiment 1.

Embodiment 1 will be explained by taking a car navigation device as an example of an on-vehicle guidance apparatus. FIG. 1 is a block diagram showing the configuration of the car navigation device in accordance with this Embodiment 1. This car navigation device is provided with a GPS (Global Positioning System) unit 11 for detecting the position of a vehicle, a gyro sensor 12, a vehicle velocity acquiring means 13 for acquiring the travelling velocity of the vehicle, a storage medium reading means 14 for reading data from a recording media, such as a CD-ROM (Compact Disk Read Only Memory), a data storage means 15, such as a hard disk, for storing data including map information, detailed guidance descriptions, and setting information such as conditions for carrying out guidance, a receiving means 16 for receiving a radio wave (designated as "S" in FIG. 1) from a television station, a radio station, or the like, a display means 17, such as a liquid crystal display, for displaying a map, the vehicle position, other information required for passengers, etc., an input operation means 18 for accepting a passenger's operation, a sound output means 19, such as a speaker, for outputting a voice showing guidance information which passengers require, such as the traveling position of the vehicle, the distance to the destination, and the time required for the vehicle to reach the destination, a sound input means 20, such as a microphone, for acquiring an environmental sound in the cabin, such as a conversation among passengers and noise in the cabin, a control processing means 21 comprised of a CPU (Central Processing Unit), a ROM (Read Only Memory), a RAM (Random Access Memory), etc., for carrying out an arithmetic process for the whole car navigation device, and a vehicle information acquiring means 22 for acquiring vehicle information including information showing whether or not a wiper is being driven, and information showing whether or not a blinker is being driven.

FIG. 2 is a block diagram showing main components of the car navigation device in accordance with Embodiment 1. The data storage means 15 is provided with a volume information storage unit 151 for storing sound volume settings of pieces of onboard equipment, such as a TV, a radio, and audio equipment, a sound volume judgment information storage unit 152 for storing a threshold for the above-mentioned sound volume settings, and a guidance information storage unit 153 for storing the detailed guidance descriptions of the car navigation device and the setting information such as the conditions for carrying out guidance.

Furthermore, the control processing means 21 is provided with a signal converting means 211 for converting data which the storage medium reading means 14 has read from the storage medium or data which the receiving means 16 has received into data in a data format which the car navigation device can understand, an output sound control means 212 for commanding the sound output means 19 to output data about sound among the converted data obtained by the signal converting means 211 at the sound volume setting acquired from the volume information storage unit 151, and for outputting the above-mentioned sound volume setting to a sound volume determining means 213, the sound volume determining means 213 for determining whether the sound volume setting outputted from the output sound control means 212 exceeds the threshold stored in the sound volume determination information storage unit 152, and a guidance output control means 214 for commanding the sound output means 19 to output a detailed guidance description acquired from the guidance information storage unit 153 on the basis of the determination results obtained by the sound volume determining means 213. Because the other components shown in the figure are the same as those shown in FIG. 1, the explanation of the components will be omitted hereafter.

Next, the operation of the on-vehicle guidance apparatus will be explained.

FIG. 3 is a flow chart showing the operation of the car navigation device in accordance with Embodiment 1. The receiving means 16 outputs data which it has received from a broadcasting station or the like to the signal converting means 211 (step ST11). The storage medium reading means 14 outputs data which it has read from the storage medium to the signal converting means 211 (step ST12). Next, the signal converting means 211 converts the data outputted from either the storage medium reading means 14 or the receiving means 16 into data in a data format which the car navigation device can understand. The output sound control means 212 then acquires a sound volume setting from the volume information storage unit 151. Next, the output sound control means 212 commands the sound output means 19 to output sound data at the sound volume setting acquired from the volume information storage unit 151 on the basis of the converted data which has been obtained by the signal converting means 211. The sound output means 19 outputs sound data according to the command from the output sound control means 212 (step ST13).

The output sound control means 212 also acquires a sound volume setting from the volume information storage unit 151, and outputs the sound volume setting to the sound volume determining means 213 (step ST14). Next, the sound volume determining means 213 determines whether or not the sound volume setting outputted from the output sound control means 212 is smaller than the threshold stored in the sound volume determination information storage unit 152 (step ST15). When, in step ST15, determining that the sound volume setting is smaller than the threshold, the sound volume determining means 213 commands the guidance output control means 214 to output guidance, and the guidance output control means 214 commands the sound output means 19 to output a detailed guidance description acquired from the guidance information storage unit 153. Next, the sound output means 19 outputs the detailed guidance description which the sound output means has been commanded to output by the guidance output control means 214 (step ST16). In contrast, when the sound volume determining means, in step ST15, determines that the sound volume setting is equal to or larger than the threshold, the car navigation device returns to steps ST11 and ST12 to continue performing the operation.

As mentioned above, the car navigation device in accordance with the present Embodiment 1 is configured in such a way as to provide guidance at a time when the volume of sound outputted from a television, a radio, audio equipment, or the like becomes small. Therefore, the present embodiment offers an advantage of preventing passengers from failing to catch important guidance, and being able to efficiently provide passengers with guidance. The car navigation device can be provided with a guidance voice storage unit 154 for storing table data consisting of voice data about various voice impersonations, such as female and male impersonations corresponding to the above-mentioned numerical value, and voice data about ways to speak, and can change the voice impersonation or the like of the guidance in addition to the time at which the car navigation device provides the guidance.

Embodiment 2.

FIG. 4 is a block diagram showing main components of a car navigation device in accordance with Embodiment 2. In this Embodiment 2, an embodiment in which the car navigation device provides guidance at a timing when the volume of a sound, such as a conversation in a cabin, becomes small will be explained. The same components as those explained in Embodiment 1 are designated by the same reference numerals as those shown in Embodiment 1, and a duplicated explanation of the components will be omitted hereafter. A data storage means 15 is provided with a guidance information storage unit 153 for storing detailed guidance descriptions of the car navigation device and setting information such as conditions for carrying out guidance, and a driving noise information storage unit 155 for storing table data comprised of vehicle velocities and noise sound volumes each of which is produced by the vehicle when travelling at a corresponding one of the above-mentioned vehicle velocities.

The control processing means 21 is provided with a conversation sound volume determining means 215 for acquiring a noise sound volume corresponding to a vehicle velocity, which is acquired from a vehicle velocity acquiring means 13, from the driving noise information storage unit 155 to determine a conversation sound volume in the cabin from the difference between the above-mentioned noise sound volume and the sound volume of an environmental sound acquired from a sound input means 20, and for determining whether or not the above-mentioned conversation sound volume is smaller than a certain threshold predetermined and stored therein, and a guidance output control means 214 for commanding a sound output means 19 to output a detailed guidance description acquired from the guidance information storage unit 153 on the basis of the results of the determination performed by the conversation sound volume determining means 215.

Next, the operation of the car navigation device will be explained.

FIG. 5 is a flow chart showing the operation of the car navigation device in accordance with Embodiment 2. The conversation sound volume determining means 215 acquires the vehicle velocity from the vehicle velocity acquiring means 13 (step ST21). Next, the conversation sound volume determining means 215 acquires the noise sound volume corresponding to the above-mentioned vehicle velocity from the driving noise information storage unit 155 (step ST22).

The conversation sound volume determining means 215 then acquires the environmental sound in the cabin from the sound input means 20 (step ST23). Next, the conversation sound volume determining means 215 calculates the conversation sound volume in the cabin from both the noise sound volume acquired in step ST22 and the sound volume of the environmental sound in the cabin acquired by the sound input means 20 to determine whether or not the conversation sound volume is smaller than the predetermined threshold stored therein (step ST24).

When, in step ST24, determining that the conversation sound volume is smaller than the threshold, the conversation sound volume determining means 215 commands the guidance output control means 214 to output guidance, and the guidance output control means 214 commands the sound output means 19 to output a detailed guidance description acquired from the guidance information storage unit 153. Next, the sound output means 19 outputs the detailed guidance description which the sound output means has been commanded to output by the guidance output control means 214 (step ST25). In contrast, when the conversation sound volume determining means, in step ST25, determines that the conversation sound volume is equal to or larger than the threshold, the car navigation device returns to step ST21 and continues performing the operation.

As mentioned above, the car navigation device in accordance with the present Embodiment 2 is configured in such a way as to provide guidance at a time when the conversation sound volume in the cabin becomes small. Therefore, the present embodiment offers an advantage of preventing passengers from failing to catch important guidance, and being able to efficiently provide passengers with guidance. The car navigation device can be provided with a guidance voice storage unit 154, and can change the voice impersonation or the like of the guidance in addition to the time at which the car navigation device provides the guidance, like that of Embodiment 1.

Embodiment 3.

In Embodiment 2, the embodiment in which the car navigation device provides guidance at a time when the conversation sound volume in the cabin becomes small is explained. In this Embodiment 3, an embodiment in which a car navigation device determines whether to output guidance according to the priority of its detailed description will be explained.

The main components of the car navigation device in accordance with this Embodiment 3 differ from those of the car navigation device in accordance with Embodiment 2 explained with reference to FIG. 4 in that a guidance output control means 214 stores table data including a correspondence between detailed guidance descriptions stored in a guidance information storage unit 153 and priorities, and a threshold for these priorities. Because the other components are the same as those of the car navigation device in accordance with Embodiment 2, the explanation of the components will be omitted hereafter.

Next, the operation of the car navigation device will be explained.

FIG. 6 is a flow chart showing the operation of the car navigation device in accordance with Embodiment 3. A conversation sound volume determining means 215 acquires a vehicle velocity from a vehicle velocity acquiring means 13 (step ST31). Next, the conversation sound volume determining means 215 acquires a noise sound volume corresponding to the above-mentioned vehicle velocity from a driving noise information storage unit 155 (step ST32). The conversation sound volume determining means 215 then acquires an environmental sound in a cabin from a sound input means 20 (step ST33). Next, the conversation sound volume determining means 215 calculates a conversation sound volume in the cabin from both the noise sound volume acquired in step ST32, and the sound volume of the environmental sound in the cabin acquired by the sound input means 20 to determine whether or not the conversation sound volume is smaller than a certain threshold predetermined and stored therein (step ST34), and, when determining that the conversation sound volume is smaller than the threshold, commands the guidance output control means 214 to output guidance. In contrast, when the conversation sound volume determining means determines that the conversation sound volume is not smaller than the threshold, the car navigation device returns to step ST31.

The guidance output control means 214 refers to the table data which the guidance output control means has according to the command from the conversation sound volume determining means 215 to acquire the priority of a detailed guidance description acquired from the guidance information storage unit 153 (step ST35). Next, the conversation sound volume determining means 215 determines whether the above-mentioned priority is higher than the predetermined priority threshold stored therein (step ST36). When, in step ST36, determining that the priority of the detailed guidance description is higher than the above-mentioned threshold, the guidance output control means 214 commands a sound output means 19 to output the guidance. Next, the sound output means 19 outputs the guidance according to the command from the guidance output control means 214 (step ST37). In contrast, when, in step ST36, determining that the priority of the detailed guidance description is not higher than the above-mentioned threshold, the guidance output control means 214 ends the operation without commanding the sound output means 19 to output the guidance.

As mentioned above, the car navigation device in accordance with the present Embodiment 3 outputs guidance according to the priority of its detailed guidance description. Therefore, the present embodiment offers an advantage of being able to inform guidance to passengers so as not to disturb the passengers as much as possible. Further advantages which are the same as those provided by Embodiment 2 are offered. The car navigation device can be provided with a guidance voice storage unit 154, and can change the voice impersonation or the like of the guidance in addition to the time at which the car navigation device provides the guidance, like that of Embodiment 1.

Embodiment 4.

In Embodiment 3, the embodiment in which the car navigation device outputs guidance according to the priority of its detailed guidance description will be explained. In contrast, in this Embodiment 4, an embodiment in when not outputting guidance, a car navigation device displays its detailed guidance description on a display means 17 will be explained. FIG. 7 is a view showing main components of the car navigation device in accordance with the present Embodiment 4. The car navigation device in accordance with the present Embodiment 4 differs from the car navigation device in accordance with Embodiment 3 in that a data storage means 15 is provided with a guidance display information storage unit 156 for storing image information corresponding to each detailed guidance description, and the car navigation device includes a guidance display control means 216 for, when the control processing means 21 does not command an output of guidance, displays image information corresponding to its detailed guidance description with reference to the guidance display information storage unit 156 on a display means 17. Because the other components are the same as those of the car navigation device in accordance with Embodiment 3, the explanation of the components will be omitted.

Next, the operation of the car navigation device will be explained.

FIG. 8 is a flow chart showing the operation of the car navigation device in accordance with Embodiment 3. A conversation sound volume determining means 215 acquires a vehicle velocity from a vehicle velocity acquiring means 13 (step ST41). Next, the conversation sound volume determining means 215 acquires a noise sound volume corresponding to the above-mentioned vehicle velocity from a driving noise information storage unit 155 (step ST42). The conversation sound volume determining means 215 then acquires an environmental sound in a cabin from a sound input means 20 (step ST43). Next, the conversation sound volume determining means 215 calculates a conversation sound volume in the cabin from both the noise sound volume acquired in step ST42, and the sound volume of the environmental sound in the cabin acquired by the sound input means 20 to determine whether or not the conversation sound volume is smaller than a certain threshold predetermined and stored therein (step ST44), and, when determining that the conversation sound volume is smaller than the threshold, commands a guidance output control means 214 to output guidance. In contrast, when the conversation sound volume determining means determines that the conversation sound volume is not smaller than the threshold, the car navigation device returns to step ST41.

The guidance output control means 214 acquires the priority of a detailed guidance description acquired from a guidance information storage unit 153 with reference to table data which the guidance output control means has according to the command from the conversation sound volume determining means 215 (step ST45). Next, the conversation sound volume determining means 215 determines whether the above-mentioned priority is higher than a predetermined priority threshold stored therein (step ST46). When, in step ST46, determining that the priority of the detailed guidance description is higher than the above-mentioned threshold, the guidance output control means 214 commands a sound output means 19 to output the guidance which the sound output means has acquired from the guidance information storage unit 153. Next, the sound output means 19 outputs the guidance according to the command from the guidance output control means 214 (step ST47). In contrast, when, in step ST46, determining that the priority of the detailed guidance description is not higher than the predetermined threshold, the guidance output control means 214 commands the guidance display control means 216 to display the detailed guidance description on the display means 17. When referring to the guidance display information storage unit 156 to acquire the image information corresponding to the detailed guidance description (step ST48), the guidance display control means 216 displays this image information on the display means 17 (step ST49).

As mentioned above, because the car navigation device in accordance with the present Embodiment 4 is configured in such a way as to, when not outputting guidance, display its guidance contents, the present embodiment offers an advantage of being able to inform the guidance to passengers so as not to disturb the passengers as much as possible, and to inform also guidance having a low priority to passengers. The car navigation device can be provided with a guidance voice storage unit 154, and can change the voice impersonation or the like of the guidance in addition to the time at which the car navigation device provides the guidance, like that of Embodiment 1.

Embodiment 5.

FIG. 9 is a block diagram showing main components of a car navigation device in accordance with Embodiment 5. In this Embodiment 5, an embodiment in which when being going to output important guidance, if a conversation sound volume in a cabin does not become small even after a predetermined period of time has elapsed, the car navigation device outputs the guidance after drawing passengers' attention by outputting a beep sound such as a jingle will be explained. The same components as those explained in Embodiments 1 to 4 are designated by the same reference numerals as those shown in Embodiments 1 to 4, and a duplicated explanation of the components will be omitted hereafter.

A data storage means 15 is provided with a guidance information storage unit 153 for storing detailed guidance descriptions of the car navigation device and setting information such as conditions for providing guidance, a driving noise information storage unit 155 for storing table data consisting of vehicle velocities and noise sound volumes each of which is produced by a vehicle when travelling at a corresponding one of the above-mentioned vehicle velocities, an output request importance degree information storage unit 157 for storing table data including a correspondence between the detailed guidance descriptions and their priorities, and a jingle storage unit 158 for storing a jingle.

A control processing means 21 is provided with a conversation sound volume determining means 215, a guidance output control means 214, an elapsed time measuring means 218, an elapsed time determining means 217, an output request importance degree determining means 219, and a jingle output control means 220. The conversation sound volume determining means 215 acquires a noise sound volume corresponding to a vehicle velocity acquired from a vehicle velocity acquiring means 13 from the driving noise information storage unit 155, and determines a conversation sound volume in the cabin from the difference between the above-mentioned noise sound volume and the sound volume of an environmental sound in the cabin acquired by a sound input means 20 to determine whether or not the conversation sound volume is smaller than a certain threshold prestored therein.

The guidance output control means 214 commands a sound output means 19 to output a detailed guidance description acquired from the guidance information storage unit 153 according to the result of the determination by the conversation sound volume determining means 215. The elapsed time measuring means 218 measures a time which elapses from the time when the guidance output control means 214 acquires the detailed guidance description from the guidance information storage unit 153 to the time when the conversation sound volume determining means 215 determines that the above-mentioned conversation sound volume is smaller than the above-mentioned threshold. When the results of the determination by the conversation sound volume determining means 215 show that the above-mentioned conversation sound volume is smaller than the above-mentioned threshold, the elapsed time determining means 217 acquires the elapsed time from the elapsed time measuring means 218, and determines whether or not the elapsed time is longer than a predetermined time prestored therein.

When the results of the determination by the elapsed time determining means 217 show that the above-mentioned elapsed time is longer than the above-mentioned predetermined time, the output request importance degree determining means 219 refers to the table data stored in the output request importance degree information storage unit 157 to determine whether or not the priority corresponding to the detailed guidance description is higher than a predetermined priority prestored therein. When the above-mentioned priority is higher than the above-mentioned predetermined priority, the jingle output control means 220 acquires the jingle from the jingle storage unit 158 and commands an output of this jingle.

Next, the operation of the car navigation device will be explained.

FIG. 10 is a flow chart showing the operation of the car navigation device in accordance with Embodiment 5. The conversation sound volume determining means 215 acquires the vehicle velocity from the vehicle velocity acquiring means 13 (step ST51). Next, the conversation sound volume determining means 215 acquires the noise sound volume corresponding to the above-mentioned vehicle velocity from the driving noise information storage unit 155 (step ST52). The conversation sound volume determining means 215 then acquires the environmental sound in the cabin from the sound input means 20 (step ST53). Next, the conversation sound volume determining means 215 calculates the conversation sound volume in the cabin from both the noise sound volume acquired in step ST52 and the sound volume of the environmental sound in the cabin acquired by the sound input means 20 to determine whether or not the conversation sound volume is smaller than the predetermined threshold stored therein (step ST54).

When, in step ST54, determining that the conversation sound volume is smaller than the threshold, the conversation sound volume determining means 215 commands the guidance output control means 214 to output guidance, and the guidance output control means 214 commands the sound output means 19 to output a detailed guidance description acquired from the guidance information storage unit 153. Next, the sound output means 19 outputs the detailed guidance description which the sound output means has been commanded to output by the guidance output control means 214 (step ST55).

When, in step ST54, determining that the conversation sound volume is equal to or larger than the threshold, the elapsed time determining means 217 acquires the elapsed time from the elapsed time measuring means 218 and determines whether or not this elapsed time is shorter than the predetermined time prestored in the elapsed time determining means 217 (step ST56). When the elapsed time determining means determines that the above-mentioned elapsed time is shorter than the above-mentioned predetermined time, the car navigation device returns to the process of step ST51. When the elapsed time determining means determines that the above-mentioned elapsed time is not shorter than the above-mentioned predetermined time, the output request importance degree determining means 219 refers to the output request importance degree information storage unit 157 and determines whether or not the priority of the detailed guidance description, i.e. the importance degree of a corresponding output request is higher than the predetermined priority prestored in the output request importance degree determining means 219 (step ST57).

When the output request importance degree determining means, in step ST57, determines that the importance degree of the output request is higher than the above-mentioned predetermined priority, the jingle output control means 220 acquires the jingle from the jingle storage unit 158 and commands the sound output means 19 to output this jingle. Next, the sound output means 19 outputs the jingle according to the command from the jingle output control means 220 (step ST58). In contrast, when the output request importance degree determining means, in step ST57, determines that the priority is not higher than the above-mentioned predetermined priority, the car navigation device returns to the process of step ST51.

As mentioned above, the car navigation device in accordance with this Embodiment 5 is configured in such a way as to, when being going to output important guidance, if the conversation sound volume in the cabin does not become small even after the predetermined period of time has elapsed, output the guidance after drawing passengers' attention by outputting a beep sound such as a jingle. Therefore, the present embodiment offers an advantage of preventing passengers from failing to catch important guidance, and being able to efficiently provide passengers with guidance. Furthermore, the car navigation device in accordance with this Embodiment 5 can be configured in such a way as to store several types of jingles in the jingle storage unit 158, and, when a conversation is not broken off even if the car navigation device outputs a jingle, i.e. when the conversation sound volume does not become smaller than the predetermined threshold, further output a different jingle. The car navigation device in accordance with this Embodiment 5 can be configured in such a way as to change the sound volume and time duration of the jingle. The car navigation device can be provided with a guidance voice storage unit 154, and can change the voice impersonation or the like of the guidance in addition to the time at which the car navigation device provides the guidance, like that of Embodiment 1.

Embodiment 6.

FIG. 11 is a block diagram showing main components of a car navigation device in accordance with Embodiment 6. In this Embodiment 6, an embodiment in which the car navigation device changes output the time of outputting voice guidance on the basis of vehicle information such as information showing whether or not a blinker is being driven will be explained. A data storage means 15 in accordance with this Embodiment 6 is provided with a guidance information storage unit 153 for storing detailed guidance descriptions and setting information such as conditions for providing guidance.

A control processing means 21 is provided with a guidance output control means 214 for determining whether to output a detailed guidance description stored in the guidance information storage unit 153 on the basis of the vehicle information acquired by a vehicle information acquiring means 22. The determination of whether to output a detailed guidance description is determined by determining whether or not the driving load on the driver of the vehicle is high. For example, because the state in which a blinker is working shows that the driving load on the driver of the vehicle is high since the driver has to make a right or left turn, or the like at the intersection, it is desirable that the car navigation device does not output any guidance. Therefore, in such the state in which the blinker is working, the car navigation device does not output any guidance, but outputs guidance after the vehicle makes a turn at the intersection and then enters a state in which the blinker is not working. Because the other components shown in the figure are the same as those explained in Embodiments 1 to 5, the other components are designated by the same reference numerals as those shown in Embodiments 1 to 5 and the explanation of the components will be omitted hereafter.

Next, the operation of the on-vehicle guidance apparatus will be explained.

FIG. 12 is a flow chart showing the operation of the car navigation device in accordance with Embodiment 6. The guidance output control means 214 acquires vehicle information from the vehicle information acquiring means 22 (step ST61). Next, the guidance output control means 214 determines whether it can output guidance on the basis of the vehicle information acquired from the vehicle information acquiring means 22 (step ST62). When the guidance output control means 214, in step ST62, determines that it can output guidance, the guidance output control means commands a sound output means 19 to output the detailed description of the above-mentioned guidance. Next, the sound output means 19 outputs the detailed guidance description which the sound output means has been commanded to output by the guidance output control means 214 (step ST63). In contrast, when the guidance output control means 214, in step ST62, determines that it cannot output guidance, the guidance output control means returns to step ST61 and then repeats the processes of steps ST61 and ST62 until the guidance output control means can output guidance.

As mentioned above, the car navigation device in accordance with this Embodiment 6 is configures in such a way as to change the time when the car navigation device outputs voice guidance on the basis of vehicle information. Therefore, when the car navigation device can determine that the driving load on the driver of the vehicle is high, such as when a blinker is being driven, the car navigation device can shift the time when the car navigation device outputs voice guidance, and then output the voice guidance after the driving load on the driver of the vehicle becomes small. Thus, the present embodiment offers an advantage of being able to provide guidance for the driver without interfering with the driver's driving. The car navigation device can be provided with a guidance voice storage unit 154, and can change the voice impersonation or the like of the guidance in addition to the time when the car navigation device provides the guidance, like that of Embodiment 1.

Industrial Applicability

As mentioned above, the present invention can be widely applied to a guidance device that enables an output of voice guidance according to conditions, and that is installed in a moving object, such as an automobile or a vehicle.

The invention claimed is:

1. An on-vehicle guidance apparatus that provides required information for a passenger, said on-vehicle guidance apparatus comprising:
    a controller comprising:
        an output sound controller configured to acquire a sound volume setting of onboard equipment;
        a sound volume determining unit configured to determine whether or not said sound volume setting is smaller than a predetermined threshold; and
        a guidance output controller configured to issue a command for carrying out voice guidance in response to a determination signal from said sound volume determining unit at a time when said sound volume setting becomes smaller than said predetermined threshold.

2. An on-vehicle guidance apparatus that provides required information for a passenger, said on-vehicle guidance apparatus comprising:
    a vehicle velocity acquiring device configured to acquire a velocity of a vehicle;
    a sound input device configured to acquire an environmental sound in a cabin;
    a controller configured to:
        determine a sound volume of a conversation in the cabin on a basis of a noise sound volume corresponding to the velocity of the vehicle acquired by said vehicle velocity acquiring device, and a sound volume of the environmental sound in the cabin acquired by said sound input device to determine whether or not said conversation sound volume is smaller than a predetermined threshold, and
        issue a command for carrying out voice guidance in response to a determination that said conversation sound volume becomes smaller than said predetermined threshold.

3. The on-vehicle guidance apparatus according to claim 2, wherein said controller is further configured to:
    acquire an elapsed time to determine whether or not the elapsed time is longer than a predetermined time when said conversation sound volume is determined to be smaller than said predetermined threshold, and
    issue a command for outputting a jingle when said acquired elapsed time is longer than said predetermined time.

4. The on-vehicle guidance apparatus according to claim 3, wherein when the conversation is not broken off even after the jingle is outputted, said controller issues a command for outputting a different jingle.

* * * * *